Sept. 8, 1959　　　　　R. B. ANDERSON　　　　　2,903,193
GRINDERS

Filed May 29, 1956　　　　　　　　　　　　2 Sheets-Sheet 1

INVENTOR
ROBERT B. ANDERSON
BY Joseph G. Werner
ATTORNEY

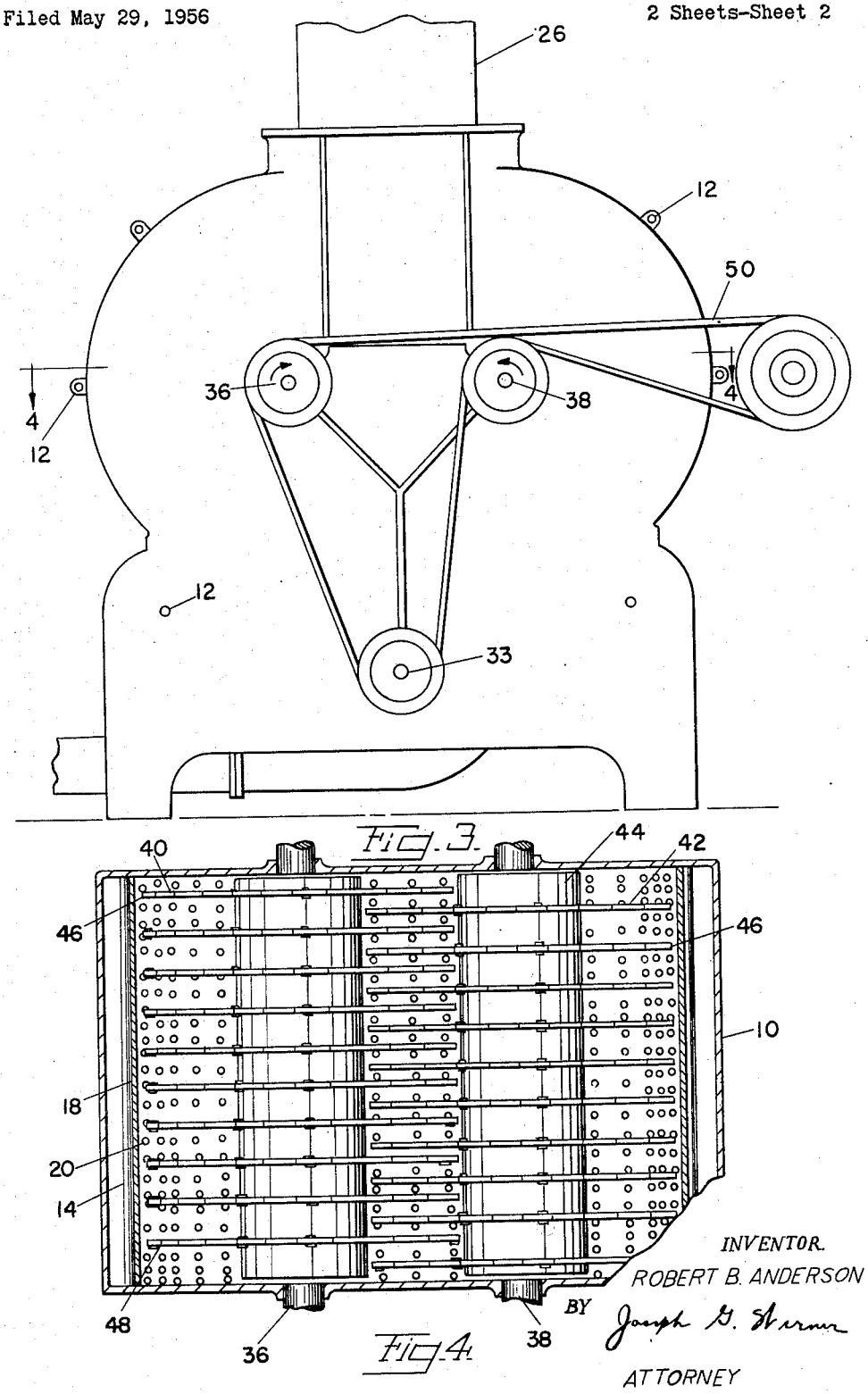

United States Patent Office 2,903,193
Patented Sept. 8, 1959

2,903,193
GRINDERS

Robert B. Anderson, Madison, Wis.

Application May 29, 1956, Serial No. 588,099

3 Claims. (Cl. 241—73)

This invention relates to improvements in grinders and is concerned more particularly with devices adapted for grinding a large variety of different materials, such as, for example, livestock feed and hay, various foodstuffs, such as, cheese, coconut, horseradish, wood and commercial fertilizer.

The present invention in general is concerned with improvements, for certain purposes, over the inventions disclosed in my Patent No. 2,753,908 issued July 10, 1956 as well as another application Serial No. 588,098, filed May 29, 1956, now abandoned.

An object of this invention is to provide a grinding device having a plurality of cutting disks provided with saw teeth on the outer peripheries thereof with the cutting disks mounted on a pair of shafts so that the cutting disks on one shaft engage between the cutting disks on the other shaft.

Another object of this invention is to provide a grinding device and cutting disks wherein the cutting disks carry agitating members projecting outwardly of opposed sides thereof for the purpose of agitating or kicking up any material between the blades so as to subject the same further to the cutting action of the disks.

A further object of the invention is to provide a grinding device having cutting disks wherein spacer means are provided between the adjacent disks on each shaft, such spacers being opposed to the peripheral edge of the cutting disk on the opposite shaft and arranged relatively thereto so as to effect an extremely fine grind of the material.

Still another object of the invention is to provide a grinding machine in which material may be ground with less power than with machines heretofore known and wherein material can be ground to a finer degree without materially increasing the power.

Other objects and advantages of the invention will be apparent from the following detailed description taken in conjunction with the accompanying drawings wherein a preferred embodiment of the principles of the invention has been selected for exemplification.

In the drawings:

Fig. 3 is an end elevational view of the device shown in Figs. 1 and 2; and

Fig. 4 is a horizontal sectional view taken on the line 4—4 of Fig. 3 and looking in the direction of the arrows.

Figure 1:
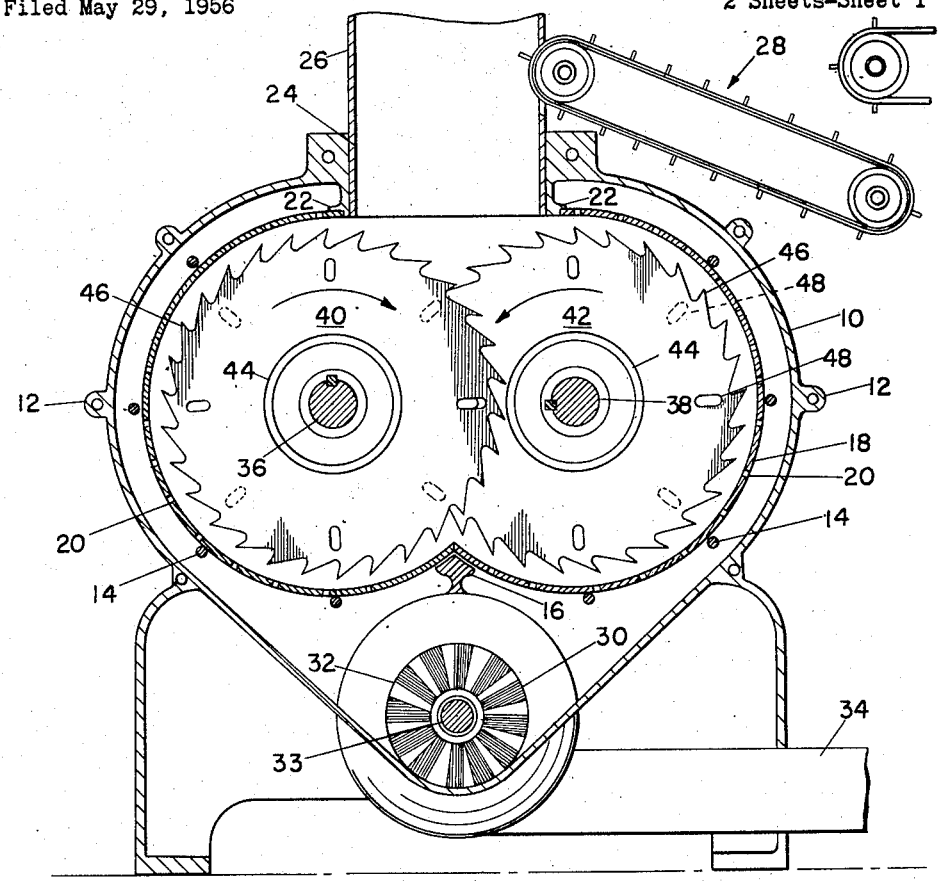
Fig. 1 is a vertical sectional view of a device constructed in accordance with the invention showing feeding means and discharge means connected thereto.
Figure 2:
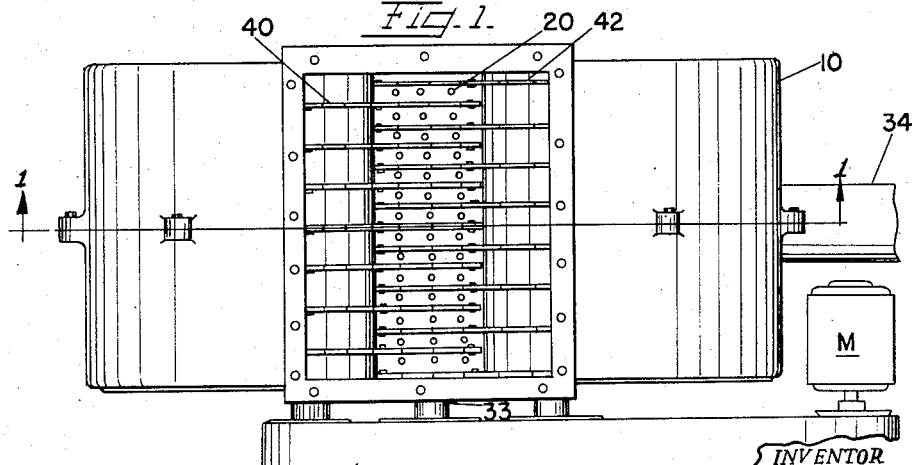
Fig. 2 is a top view of the device shown in Fig. 1 with the feeding means removed and additionally showing the grinder motivating means.

Referring more particularly to the drawings, wherein like numerals refer to like parts, the device as shown comprises an outer casing 10, which may be formed of opposed sections secured together as indicated at 12, and provided with a plurality of cross bars or the like 14 and an upright pedestal 16 for supporting an inner casing 18. The outer walls of casing 18 are provided with perforations 20 and, as also shown in Fig. 1, the walls form a pair of cylindrical chambers with laterally spaced axes intersecting each other intermediate said axes.

The top portion of housing 10 is provided with opposed depending lips 22 to which the upper end walls of the inner casing 18 are secured and an opening 24 for receiving an inlet conduit 26 for feeding material from the conveyor means 28 into the inner casing 18 to be ground. The inlet conduit 26 also serves as an air vent for the housing 10 and the casing 18.

The bottom wall portions of housing 10, as shown in Fig. 1, are sloped downwardly toward each other and form a trough communicating at one end with an opening 30 in the side wall of the housing. A fan type blower 32 is mounted on shaft 33 to communicate with the opening 30 to convey ground material passing through the perforations 20 of the inner casing 18 to a discharge conduit 34.

Shafts 36 and 38, respectively, are mounted for rotation within each of the cylindrical chambers formed in the casing 18 in the axes thereof and a plurality of cutting and agitating disks 40 and 42, respectively, are mounted in spaced relationship on the shafts 36 and 38. As shown, the disks on one shaft are staggered with respect to the disks on the other shaft and spacing collars 44 are provided between the adjacent disks on each shaft whereby the disks of each shaft overlap those of the other shaft. Both the disks 40 and 42 and the collars 44 are keyed to their respective shafts for simultaneous rotation therewith. As shown, the relative diameters and arrangement of opposed disk and collar members are such that the members barely clear each other during the rotary grinding operation. Each of the disks 40 and 42 is provided with a plurality of saw or cutting teeth 46 spaced around the periphery thereof and, as shown, the opposed edges of each of the teeth 46 preferably taper uniformly toward each other to a sharp point. It has been found that teeth of this configuration are particularly effective in the grinding of such materials as wood and animal feeds. Each of the disks 40 and 42 also carries on opposite sides thereof outwardly projecting knockers or agitating members 48 at spaced intervals. In one efficient form of the invention the agitating members 48 on one side of the disk may be spaced apart a distance of 90 degrees with the agitating members on the opposite side similarly spaced and intermediately positioned. Such agitating members 48 are preferably in the form of elongated beads or mound shaped elements soldered or otherwise suitably secured to the disks in such a manner as to agitate or knock upwardly by centrifugal force any material falling between the disks during the grinding operation. The agitating members 48 move downwardly between adjacent blades of the opposite rotor and knock material which is wedged therebetween downwardly toward the perforated cylinders 18. Particles which are too large to pass through the perforations 20 are lifted by the lugs 48 and the centrifugal force imparted by the rotation of the rotors 40, 42 around the peripheral space between the hubs 44 and the chambers 18 to be reground between the rotors 40, 42.

The device may be driven in any suitable manner such as by the electric motor M at speeds ranging from about 1,800 to 4,000 revolutions per minute and driving belt 50 which rotates the blower shaft 33 and reversely rotates the grinder shafts 36 and 38, the former in a clockwise and the latter in a counterclockwise direction.

In operation, the material to be ground is fed through the inlet conduit 26 into the rotating saw and agitating assemblies disposed within the casing 18 and is torn apart by the sawtooth 46. When the material has been sufficiently reduced in size it passes through the perforations 20 and is then directed by the blower 32 into the discharge conduit 34. Any material lodging between adjacent cutting disks is agitated or thrown outwardly and upwardly by the projecting agitating members 48 into the area of the cutting teeth until it also is sufficiently reduced in size.

It is to be understood that the present invention is not confined to the particular construction and arrangement of parts herein illustrated and described but embraces all such modifications thereof as may come within the scope of the following claims.

I claim:

1. In a grinding machine an outer casing having an inlet opening, an inner casing mounted within said outer casing and having perforated walls with an upper opening communicating with said inlet opening, said inner casing being formed as two substantially cylindrical chambers having laterally spaced axes and communicating intermediate said axes, a shaft extending through each of said chambers and rotatably mounted substantially on said respective axes, cutting and agitating means fixed on each said shaft comprising a plurality of circular saws placed along and secured at the hub to said shaft and interleaved with the circular saws on the opposite shaft, the diameter of said saws being slightly less than the inner diameter of said chambers and the spacing of said axes being sufficient to provide close spacing between the tips of said saw blades and the hub of said blades on the opposite shaft, means driving said shafts to rotate in opposite directions at high speed to grind material downwardly between said saws, and a plurality of lugs secured to said saw blades intermediate said hubs and said tips and projecting outwardly between adjacent blades for clearing material from between said blades and lifting into the upper portion of said chambers for regrinding between said saws material which is too large to pass through said perforated walls.

2. Apparatus according to claim 1 in which said lugs are angularly spaced around said saw blades.

3. Apparatus according to claim 2 in which the teeth of said saw blades converge to a sharp point.

References Cited in the file of this patent

UNITED STATES PATENTS

| 19,541 | Blanchard | Mar. 9, 1858 |
| 464,832 | Smith et al. | Dec. 8, 1891 |
| 1,006,573 | Lockwood | Oct. 24, 1911 |
| 1,908,548 | Smith | May 9, 1933 |
| 2,584,262 | De Lamater | Feb. 5, 1952 |
| 2,753,908 | Anderson | July 10, 1956 |

FOREIGN PATENTS

| 51,297 | Sweden | Mar. 29, 1922 |
| 217,174 | Germany | Dec. 24, 1909 |
| 596,776 | Germany | May 15, 1936 |
| 752,172 | France | July 10, 1933 |